UNITED STATES PATENT OFFICE.

PETER TOWNSEND AUSTEN, OF BROOKLYN, ASSIGNOR TO WILLIAM J. MATHESON & CO., LIMITED, OF NEW YORK, N. Y.

COLORING-MATTER FROM LOGWOOD AND PROCESS OF MAKING SAME.

SPECIFICATION forming part of Letters Patent No. 529,691, dated November 27, 1894.

Application filed August 30, 1894. Serial No. 521,658. (No specimens.)

*To all whom it may concern:*

Be it known that I, PETER TOWNSEND AUSTEN, a citizen of the United States, and a resident of Brooklyn, in the county of Kings and State of New York, have invented certain new and useful Coloring-Matters, of which the following is a specification.

This invention relates to the production of coloring matter from logwood. I have discovered that if to a solution of logwood extract or to sirupy logwood extract a small percentage of borax is added the liquid thickens and if the mixture is evaporated to dryness, a friable mass is easily obtained, which is not affected by atmospheric heat and is practically non-deliquescent. To carry this process into effect I add to ordinary sirupy logwood extract of about 60° Twaddle about one per cent. to three per cent. of pulverized borax, depending on the nature of the extract, stir the mass well, and then subject it to desiccation at a gentle heat until it becomes perfectly dry. This desiccation may be effected at a temperature not exceeding 85° centigrade. When the material is dried, it is crushed to a coarse powder, and is then ready for packing. In place of adding the borax to the logwood extract of the strength desired it may be added to the extract previous to or at any stage of its concentration, or a dilute solution of borax may be used as the extractive agent and the solution thus obtained may be evaporated to dryness.

This coloring matter, prepared as above indicated, has a high tinctorial power, and with the various mordants produces shades of great purity. Other soluble borates, or boric acid and ammonia, may be used in place of borax, but with less advantage.

In the making of the product above described, I do not limit myself to the figures of temperature and proportion given, as these are only examples which may be varied within wide limits and yet a coloring matter produced superior to the ordinary solid extract obtained by the evaporation of an ordinary aqueous solution of extract of logwood.

What I claim is—

1. In the art of making coloring matter the improvement which consists in evaporating a solution of logwood extract and borax at a low temperature until a dry, friable and practically non-deliquescent product not affected by atmospheric heat is obtained as and for the purpose described.

2. In the art of making coloring matter the improvement which consists in subjecting comminuted logwood to the extractive action of a dilute solution of borax and subsequently evaporating the solution until a dry and friable product is obtained as and for the purpose described.

3. A new coloring matter consisting of a desiccated mixture of logwood extract and borax, being a dry friable and practically non-deliquescent solid not affected by atmospheric heat, as described.

Signed at New York, in the county of New York and State of New York, this 28th day of August, A. D. 1894.

PETER TOWNSEND AUSTEN.

Witnesses:
JOHN B. JOY,
BENJ. D. BACON.